United States Patent
Roberts et al.

(10) Patent No.: US 7,269,928 B2
(45) Date of Patent: Sep. 18, 2007

(54) PREFORMED SELF SUPPORTING TILE SUBSTRATUM FOR CABINETS, VANITIES, BAR TOPS AND OTHER FORMS OF COUNTER TOPS

(75) Inventors: Jonathan A. Roberts, Tucson, AZ (US); Christian P. Bowen, Tucson, AZ (US)

(73) Assignee: Colewest Group, Tucson, AZ (US)

( * ) Notice: Subject to any disclaimer, the term of this patent is extended or adjusted under 35 U.S.C. 154(b) by 257 days.

(21) Appl. No.: 10/619,283

(22) Filed: Jul. 14, 2003

(65) Prior Publication Data
US 2004/0017135 A1    Jan. 29, 2004

Related U.S. Application Data

(60) Provisional application No. 60/395,417, filed on Jul. 15, 2002.

(51) Int. Cl.
  *E04B 1/14* (2006.01)
(52) U.S. Cl. ............... 52/747.11; 428/49; 428/316.6; 312/140.3
(58) Field of Classification Search ........... 428/49, 428/316.6, 703; 106/672, 705, 679; 52/384, 52/385, 747.11; 312/140.3
See application file for complete search history.

(56) References Cited

U.S. PATENT DOCUMENTS 5,030,502 A * 7/1991 Teare ..................... 428/193
5,622,556 A * 4/1997 Shulman .................. 106/677
5,976,670 A   11/1999 Fugazzi ................... 428/161
6,572,697 B2 * 6/2003 Gleeson et al. ............ 106/705

FOREIGN PATENT DOCUMENTS

| EP | 1 181 882 A1 | 2/2002 |
| GB | 2190627 A | 4/1987 |
| WO | WO99/14449 | 3/1999 |
| WO | WO 02/31287 A1 | 4/2002 |

* cited by examiner

*Primary Examiner*—Alexander S. Thomas
(74) *Attorney, Agent, or Firm*—Lawrence R. Oremland, P.C.

(57) ABSTRACT

A new and useful preformed, self supporting article is provided, which can function as a tile substrate. The tile substratum has inherent durability, strength and ease of application and reduces the installation process for building tile to such a degree as to be significantly easier and faster than built up substratum and in addition requires no other structural components such as wood or plywood. The tile substrate is formed of lightweight cast or preformed mixture of cement/expanded polystyrene and water, which individually or when assembled together, provide a complete, ready to tile substratum. Individually or in assembly the substratum units are self-supporting, and require a minimum of modification to complete their installation. The units are lightweight by design. Individual units are designed and manufactured to address the majority of common tiled counter top configurations with easy modification or cutting to size. Common counter top configurations may include but are not limited to: Plain or blank kitchen or bath counter tops, plain or blank bar top or counters, sink and stove surrounds of various sizes and shapes, corner build-outs of triangular and other geometric shapes in various sizes and end caps of assorted sizes and shapes.

2 Claims, 4 Drawing Sheets

PREFORMED SELF SUPPORTING TILE SUBSTRATUM FOR CABINETS, VANITIES, BAR TOPS AND OTHER FORMS OF COUNTER TOPS

RELATED APPLICATION/CLAIM OF PRIORITY

This application is related to and claims priority from Provisional Application Ser. No. 60/395,417, filed Jul. 15, 2002.

FIELD OF INVENTION

The present invention relates to a preformed, self supporting article that can form a substratum for tile installation, and particularly a substratum that can form an underlayment utilized to install ceramic, porcelain, natural stone and other tile-like materials upon kitchen and bath cabinet bases, bar tops, barbeque stands and other forms of counter tops.

BACKGROUND

Though there are numerous methods utilized in building and installing tiled counter tops the general requirements of any tile substratum include strength, rigidity and water resistance. To be readily and easily implemented or utilized the tile substratum should be mechanically and chemically compatible with common and customary materials and practices. A brief description of the common methods will help to communicate the basics of tile counter top construction and help to clarify the substantial improvement provided by the substratum of the present invention (which is often referred to herein as "Tilebase"). Also, in this application, reference to a "substratum" is intended to mean an article that functions as a substratum for tile, on an article such as a cabinet base, vanity, bar top, barbeque stand or other type of counter top.

Built up counter top substratum is the method commonly utilized in the installation of tile. A common counter or cabinet base is placed upon floor adjacent to wall or partition. A wooden base, substantial and strong, typically a good grade of thick plywood or particleboard, is cut to an out line roughly conforming to the desired outline of the finished counter top. The wood base is positioned upon the cabinet base and having been positioned to correspond with the desired finished counter top is securely and permanently fastened in place by use of suitable hardware or glue or both. Cement board, cut from construction panels or other specifically designed backer board material to closely correspond to the same cut outline as wood base and having been positioned on top of the wood base is securely and permanently affixed there on by use of a combination of specially designed screws and glue. Edge backer strips, having been cut from cement board construction panels or other tile backer material are permanently attached to any edges of the wood base which are intended to be tiled. Back splash support, commonly a piece of wood of such dimensions and proportions as to correspond closely with the dimensions and proportions of the desired finished back splash is positioned adjacent to wall on top of tile bed and is permanently secured in place by use of appropriate means, commonly screws. Back splash backer, cut to appropriate dimensions from construction panels or other suitable backer material is then positioned on the upper most surface of tile bed adjacent to and in close contact with back splash support and is permanently secured there by appropriate means. In the event that a back splash is not desired, which is often the case, back splash support and back splash backer are omitted. Many variations of the built up tile counter method employ less desirable materials such as dry wall, and water resistant dry wall in place of cement backer board.

The built up method of tiled counter top construction produces an acceptable tile substratum. However, it is time consuming, and requires a substantial assortment of materials and tooling and a relatively skilled craftsperson to achieve an acceptable finished product.

SUMMARY OF THE PRESENT INVENTION

The present invention, often referred to herein as Tilebase, provides a preformed, self supporting article that can form a tile substratum that has inherent durability, strength and ease of application and reduces the installation process to such a degree as to be significantly easier and faster than built up bases and in addition requires no other structural components such as wood or plywood.

Tilebase is a system of preformed, self supporting cement/expanded polystyrene(EPS) units, which individually or when assembled together, provide a complete, ready to tile substratum. Individually or in assembly the pieces (units) are self-supporting, and require a minimum of modification to complete their installation. The units are lightweight by design. Individual units are designed and manufactured to address the majority of common tiled counter top configurations with easy modification or cutting to size with basic tools. Common counter top configurations may include but are not limited to: Plain or blank kitchen or bath counter, plain or blank bar top or counters, sink and stove surrounds of various sizes and shapes, corner build-outs of triangular and other geometric shapes in various sizes and end caps of assorted sizes and shapes.

Further features of the present invention will become further apparent from the following detailed description and the accompanying drawings.

DETAILED DESCRIPTION

As described above, the present invention provides a preformed, self-supporting article that can form a tile substratum that is useful with various types of counter top articles. The principles of the invention are described herein in connection with the application of tile to a substratum for counter tops for, e.g. cabinet bases, vanities, stove supports, bar tops, barbeque stands, and other types of counter top articles, but it will be clear how those principles can be used with other types of articles for which a preformed self supporting article that can function as a tile substratum is desirable.

Figure 1:
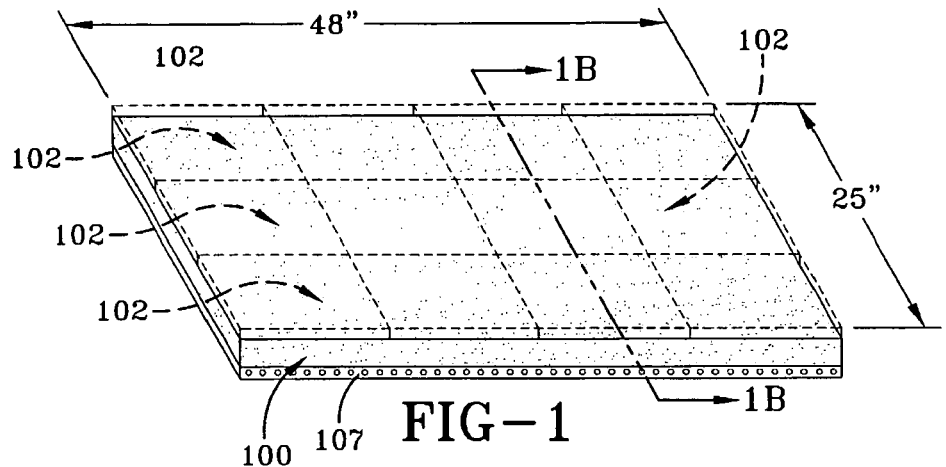
FIG. 1 is a schematic perspective view of a preformed, self supporting tile substratum according to the present invention.
Figure 1A:
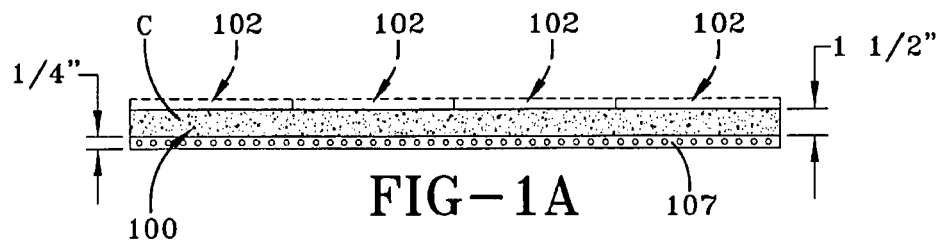
FIG. 1A is a side view of the tile substratum of FIG. 1.
Figure 1B:
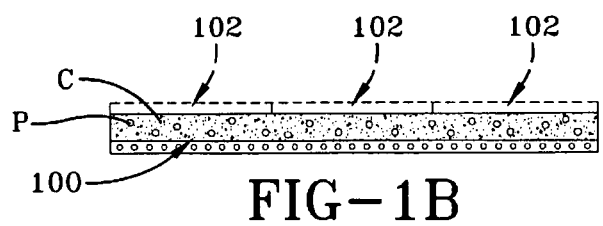
FIG. 1B is a sectional view of the tile substratum of FIG. 1, taken from the direction 1B-1B.

FIGS. 1, 1A-AC illustrates a tile substratum (Tilebase) 100 formed according to the principles of the present invention. The tile substratum 100 is a preformed unit, and in practice one or more of such preformed units would be used to form a tile substratum for a counter top type of article. The substrate 100 comprises a preformed, self-supporting, preferably monolithic, structure that can be formed, e.g. by a casting process. The substrate 100 can also be formed by other methods such as molding, pressing or extruding. The choice of method is determined in large degree by the relative costs involved as opposed to a particular method's effect on the characteristics of the finished product. Following the forming process the tile substratum 100 may or may not be subjected to drilling, sawing or grinding or other operations to achieve the desired final characteristics of the tile substratum. In FIGS. 1, 1A-1C, a series of tiles 102 are schematically shown on the tile substratum 100.

In this application, reference to the tile substratum being "self supporting" means that it has sufficient strength that when the substratum is resting on a cabinet base or other type of counter top base, and is supporting a tile array, the substratum will substantially maintain its shape under normal conditions of substratum use. Thus, the substratum 100 of FIG 1 is designed to maintain its configuration (under its own weight and the weight of tiles it is supporting) when it is resting (generally horizontally) on a cabinet base 104 such as shown in FIG 2A, that has about a 24 inch span 104A. The cabinet base 104 typically comprises vertical walls configured with an opening between the vertical walls. The cabinet base may have stringers (not shown), corner pieces 105, or other hardware to enable the substratum 100 to be secured to the walls of the cabinet base, as is well known to those in the art. In this application, reference to a substratum being supported directly on a "cabinet style base" is intended to include a base of the type shown in FIG 2A that has vertical walls, with a opening between the vertical walls, and which may have stringers, corner pieces or other hardware that enables a substratum to be secured to the base, and with the substratum resting directly on the vertical walls and covering the opening (see FIGS 2 and 2A).

Composition: The units of Tilebase are preferably cast, molded or otherwise formed of a mixture of cement/expanded polystyrene (EPS) and water. A mixture of Cement/expanded polystyrene (EPS) and water is the basic composition of Tilebase (see e.g. FIG. 1B). The expanded polystyrene material can be, e.g., a Styrofoam® like material (Dow Chemical) that is ground or otherwise formed into small beads that can be conveniently mixed with cement. The cement/expanded polystyrene material preferably also contains fibrous materials and may or may not contain various other ingredients, materials and compounds, in minor or major proportions, to enhance or minimize particular characteristics of the mixture or the finished casting.

Figure 1C:
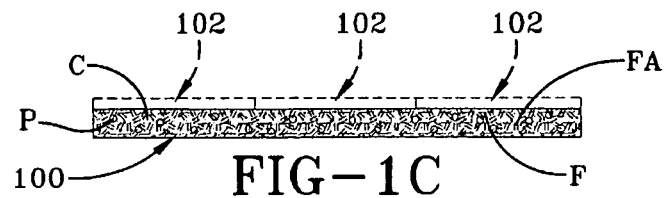
FIG. 1C is a sectional view of a tile substrate, and showing a different composition than the tile substrate of FIG. 1B.

One preferred composition of Tilebase, useful for forming substratum articles that are about 48" long, 25" wide and 1.5" thick, would comprise Portland cement/expanded polystyrene, fly ash, water and nylon or polypropylene fibers (In FIG. 1C, the cement is schematically illustrated by "C", the expanded polystyrene beads by "P", the fibrous material by "F" and the fly ash by "FA"). The composition is preferably formed from the foregoing materials in the following proportions: 14 cu ft of small expanded polystyrene beads, 230 pounds Portland cement, 70 pounds fly ash, 18 gallons water, and fibers as desired. Moreover, in a preferred embodiment, a 0.25-inch layer of EPS foam 107 can be bonded to the bottom of the composition, to further maintain the integrity of the substratum. When cast or molded, the layer of EPS foam 107 is provided in the bottom of the mold, the composition is mixed, poured into the mold, compressed, and screed, and then allowed to cure. The cured substratum unit is then milled (if needed to finish its surface) before being removed from the mold.

Additives, in major or minor proportions, may or may not include but are not limited to: expanders or fillers such as baked clay, expanded sand, expanded minerals, expanded shale hollow glass spheres, plastic foams or particles of various compositions or other expanders or extenders which may be used to reduce the weight of the finished product without deleteriously decreasing its strength. Additional additives, in major or minor proportions, may or may not include but are not limited to glass fibers, graphite fibers, ceramic fibers, polypropylene fibers, metallic fibers or other commercially available fibrous materials which are utilized in varying proportions to increase the strength of a casting and or improve a castings cracking or fracture characteristics.

Other additional additives may or may not include but are not limited to accelerators, curing agents, surface conditioning agents, colorants or other products which may be introduced or included in the mixture to enhance or reduce particular characteristics of the finished product or particular characteristics of the molding or casting mixture itself. For example, accelerators and/or curing agents may be useful in colder conditions to help the mixture cure faster. Colorants may be particularly desirable if the preformed; self-supporting article is intended to function as the counter top itself, rather than a substratum for a tiled counter top.

In practice, kitchen counter tops customarily are approximately 2 inches thick by 25 inches wide. Bathroom vanity tops customarily are approximately 2 inches thick by 22 inches wide. For descriptive purposes the lengths of these units will be arbitrarily set at approximately 48" though in practice a number of units of shorter and longer dimensions may be utilized dependent on the particular application among numerous other considerations.

Figure 2:
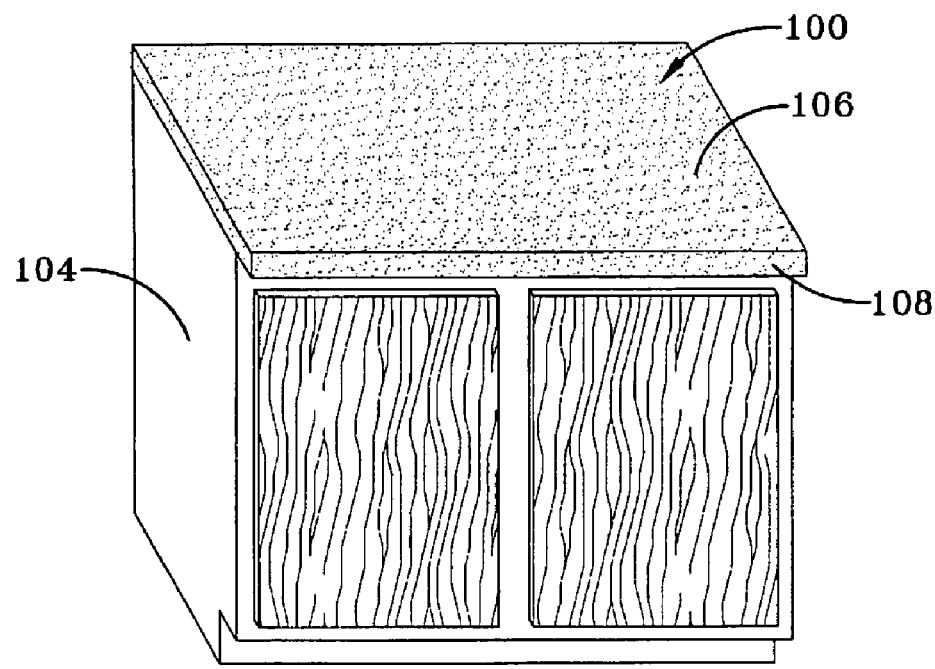
FIG. 2 is a schematic, perspective illustration of a tile substratum according to the present invention, installed on a cabinet base.
Figure 2A:
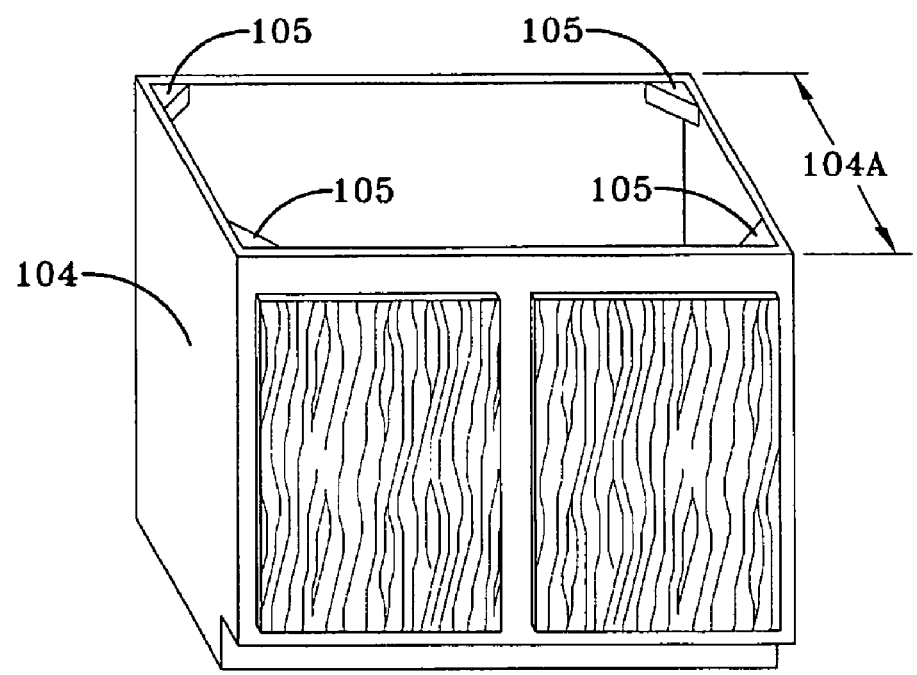
FIG. 2A is a schematic, perspective illustration of a cabinet base, upon which a tile substratum of the invention can be installed.
Figure 3:
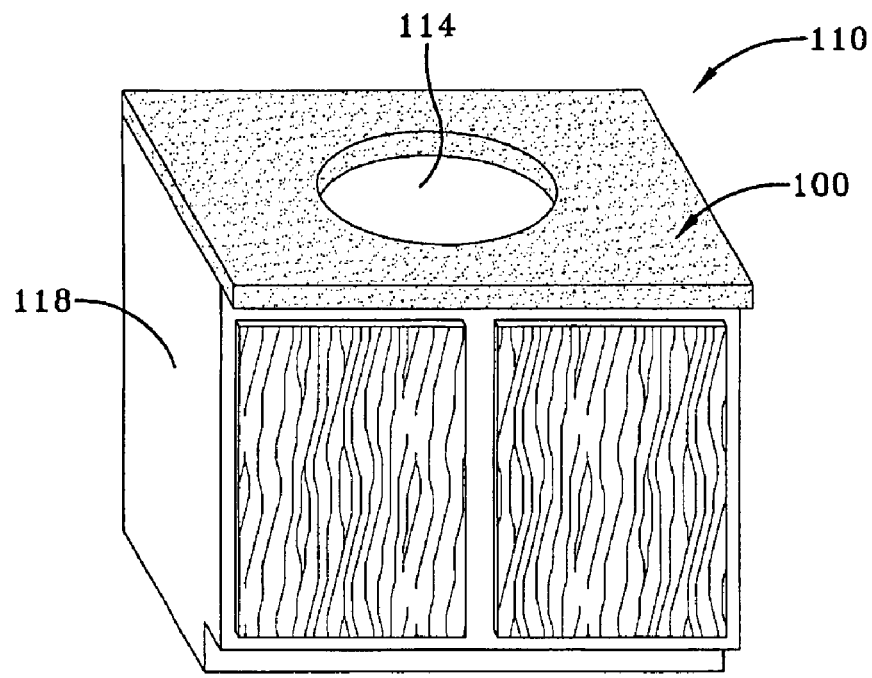
FIG. 3 is a schematic, perspective view of a tile substratum according to the present invention, installed on a sink base, and including a cutout for sink installation.

For the purpose of clarity and to facilitate a concise description of the concept of the Tilebase concept, the following description breaks a countertop down into individual units (e.g. FIG. 2 illustrates an individual cabinet unit, FIG. 3 illustrates a sink unit, etc.). In reality the individual units or components of a particular countertop are not individual in nature but are in fact integrated into a single monolithic conglomerate of such components.

Figure 4:
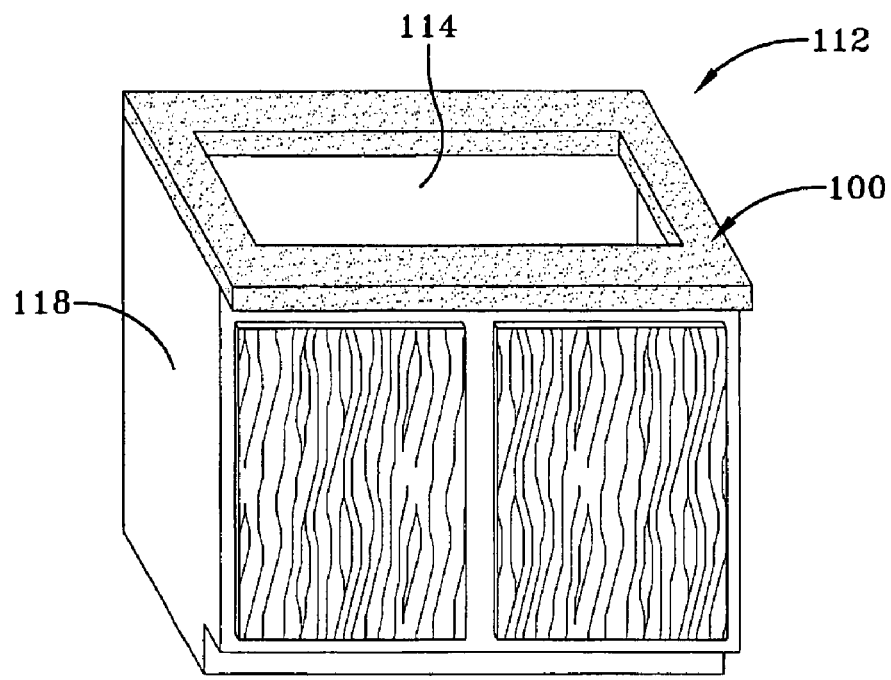
FIG. 4 is a schematic, perspective illustration of a tile substratum according to the present invention, installed on a stove base, with a cutout for stove installation.
Figure 5:
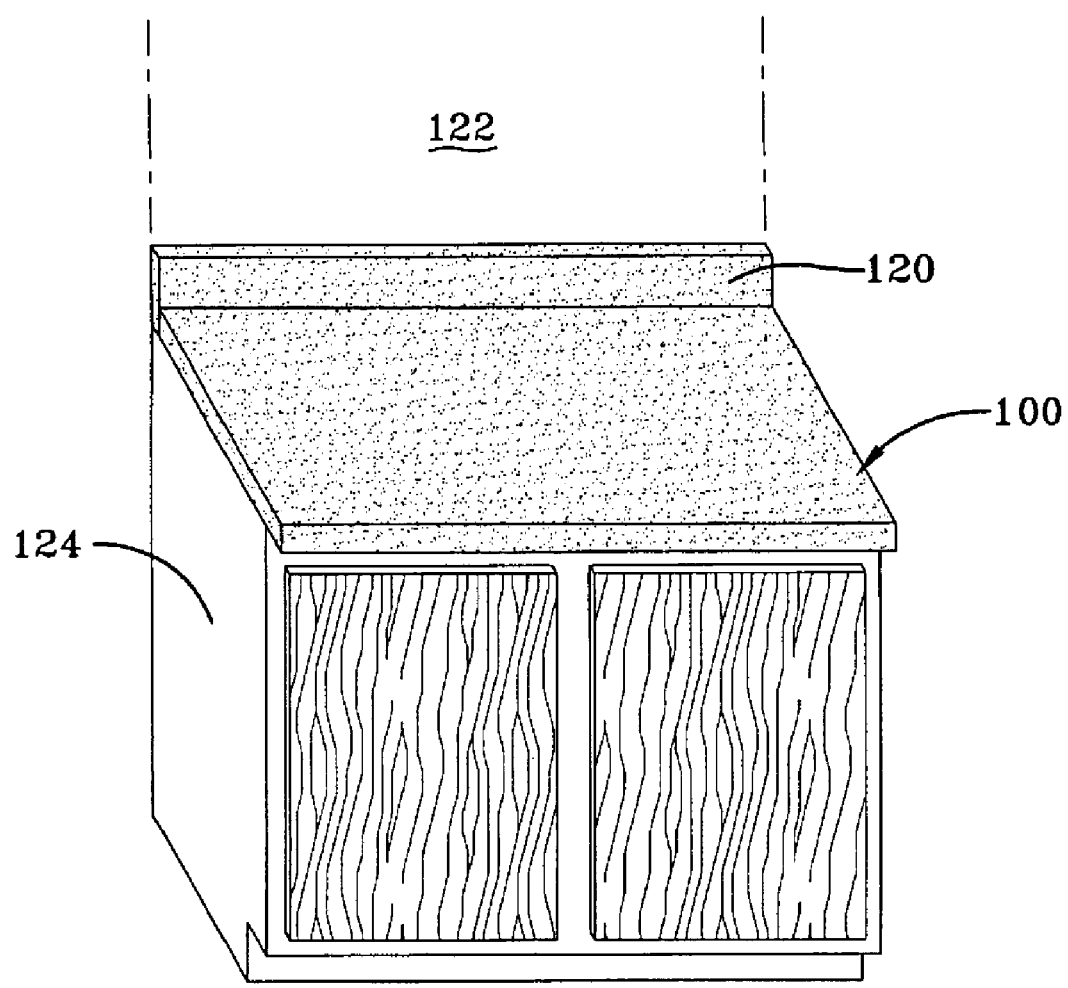
FIG. 5 is a schematic, perspective illustration of a tile substratum according to the present invention installed on a cabinet base, and further including a backsplash.

Additionally, the descriptions of certain types of countertop units described herein (e.g. FIGS. 2, 3, 4) omit back splash as an integrated part of the individual units, and the example of FIG. 5 relates to back splash as a section of an individual unit. This form of description is intended to (i) simplify the general presentation of the general concept or basis of the Tilebase concept, of which the back splash is an important though not critical component and to (ii) better communicate that in practice the utilization of a cut section of Tilebase as a back splash module is much easier to implement and is superior to integrally cast or molded back splash units in numerous ways, some of which will be elucidated further in this application.

FIG. 2 depicts an individual module or unit of the Tilebase 100 positioned on top of a typical cabinet base structure 104. The Tilebase unit 100 is securely attached to the cabinet base 104 by use of screws or other suitable fasteners that easily pass through the Tilebase unit, and couple the Tilebase unit to the stringers, corner pieces 105, or other hardware associated with the cabinet base. In addition a suitable adhesive may or may not be used. As seen in FIG. 2, a Tilebase unit 100 is configured to be supported by a cabinet base 104 in a substantially horizontal orientation.

The top or upper most surface 106 and the front surface 108 of the Tilebase 100 (FIG. 2) are flat and smooth and ready to be tiled. Side surfaces and back surface are also flat and smooth and may or may not be tiled as necessary; dependent on whether either or both are left exposed when installation is complete. For instance these sides might be abutted in close proximity to a wall or partition against which a counter top would commonly be placed and thus not require tiling. In many instances side surfaces and back surfaces will be joined to other units of the Tilebase to form a complete countertop assembly (substratum).

Tilebase units form a structure of ample strength and rigidity to provide a superior tile mounting medium or backing when installed on a cabinet base or frame and to span the limited distances required to incorporate a dish washer, oven, trash compactor or other under counter appliance unsupported by any other structure. An important design characteristic of Tilebase becomes apparent in the event that the width is excessive for a specific installation. In this case a cutting, grinding or other appropriate process may modify the width. Furthermore, Tilebase, which is manufactured in 48" by 25" by 1.5" units, can be modified to fit any width or shape by simply cutting with a handsaw or other cutting device. Tilebase is infinitely modular and when cut the new surface can be tiled directly without additional preparation.

Fixture Surrounds

FIGS. 3 and 4 show building units in which a drop in sink surround unit 110 (FIG. 3) or drop in stove surround unit 112 (FIG. 4) are formed from the Tilebase 100. A hole 114 is located in an appropriate place to accept the insertion of a drop-in sink or stove. Tilebase can be modified to accept any size drop-in and retain structural integrity. In each building unit, a base structure 118 supports the Tilebase in a substantially horizontal orientation.

Backsplash

FIG. 5 shows a backsplash 120 positioned on top of a counter and adjacent to a wall or partition 122. Also depicted is a Tilebase unit 100 installed on a standard cabinet base 124. One of the benefits of Tilebase is that it can be modified to fit any usage. The backsplash 120 is simply a cut portion of Tilebase placed vertically as a backsplash. The backsplash 120 can be cut from the Tilebase, on site, which will save time and money for the installer.

Additional Applications:

This application has focused on the traditional tile applications for kitchen counters and bathroom vanities there are many other uses for Tilebase. Tilebase can also be used for the following: tub surrounds, exterior tabletops, barbeque stand tops. Tilebase can be used for any traditional tile application due to its versatility, durability and ease of use. In addition, there may be circumstances in which the preformed, self-supporting article can be used as the countertop itself, without necessarily forming a tile substratum. As explained above, in those circumstances, it is likely to be desirable to provide a colorant as an additive to the Tilebase article.

The invention claimed is:

1. A method of forming a tiled countertop, comprising the steps of
   providing a base that comprises vertically extending walls with an opening at the top of the walls,
   providing a preformed, self supporting tile substrate consisting essentially of a mixture that includes cement, expanded polystyrene and water,
   placing the preformed, self supporting tile substrate directly onto the base, with the preformed, self supporting tile substrate in direct contact with the vertical walls of the base and covering the opening at the top of the walls, and thereafter
   placing one or more tiles on the preformed self supporting tile substrate.

2. The method of claim 1, wherein the step of providing a preformed, self-supporting tile substrate consists essentially of forming a mixture with the following ratio of materials: 14 cu feet of small expanded polystyrene beads, 230 pounds Portland cement, 70 pounds fly ash, 18 gallons water, and a selected amount of reinforcement.

* * * * *